United States Patent [19]

Horowitz et al.

[11] 4,440,670

[45] Apr. 3, 1984

[54] METHOD OF SYNTHESIZING HIGH SURFACE AREA UNAGGLOMERATED NOBLE METAL PYROCHLORE COMPOUNDS

[75] Inventors: Harold S. Horowitz, Edison; Joseph T. Lewandowski, Middlesex, both of N.J.

[73] Assignee: Exxon Research and Engineering Co., Florham Park, N.J.

[21] Appl. No.: 430,237

[22] Filed: Sep. 30, 1982

[51] Int. Cl.³ ............................ C01G 55/00; H01B 1/08
[52] U.S. Cl. .................................... 252/518; 423/593; 429/40
[58] Field of Search ........................ 423/593; 429/40; 252/518

[56] References Cited

U.S. PATENT DOCUMENTS

| 4,124,539 | 11/1978 | Horowitz et al. | 423/593 |
| 4,129,525 | 12/1978 | Horowitz et al. | 423/593 |
| 4,176,094 | 11/1979 | Horowitz et al. | 423/593 |
| 4,192,780 | 3/1980 | Horowitz et al. | 423/593 |
| 4,225,469 | 9/1980 | Horowitz et al. | 423/593 |

OTHER PUBLICATIONS

Longo et al., "Mat. Res. Bull.", vol. 4, 1969, pp. 191-202.
Bouchard et al., "Mat. Res. Bull.", vol. 6, 1971, pp. 669-680.
Sleight, "Mat. Res. Bull.", vol. 6, 1971, pp. 775-780.
Landsberg et al., "Journal of Metals", Aug. 1965, pp. 856-860.

Primary Examiner—Herbert T. Carter
Attorney, Agent, or Firm—John W. Ditsler

[57] ABSTRACT

A method of preparing electrically conductive pyrochlore compounds of high surface area and unagglomerated form, having the formula $$A_2[B_{2-x}A_x]O_{7-y}$$

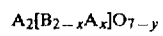

is disclosed wherein A is selected from lead, bismuth and mixtures thereof, B is selected from ruthenium, iridium and mixtures thereof, $0 < x \leq 1.0$ and $0 \leq y \leq 1$. The method involves (1) synthesizing the pyrochlores in an aqueous alkaline reaction medium having a pH of at least about 12.0 and in the presence of an oxygen source (2) displacing the reaction medium with water, (3) atomizing the resultant slurry and (4) freeze drying the resultant product. The pyrochlore compounds thus prepared have a variety of applications including use as oxygen electrodes in electro-chemical devices.

21 Claims, 3 Drawing Figures

METHOD OF SYNTHESIZING HIGH SURFACE AREA UNAGGLOMERATED NOBLE METAL PYROCHLORE COMPOUNDS

BACKGROUND OF THE INVENTION

1. Field of the Invention

The present invention is directed to a method of preparing pyrochlore structure compounds. More particularly, the present invention is directed to a method of preparing lead-rich and bismuth-rich ruthenate and iridate pyrochlores in an alkaline reaction medium.

2. Description of Relevant Art

A number of electrochemical devices have been developed for producing electrical energy by electrochemical reaction and, conversely, for consuming electrical energy to effect electrochemical reactions. Many devices rely upon a reaction involving oxygen (or air) as part of the mechanism to accomplish the desired result. For example, such devices may contain oxygen electrodes, which are oxygen reducing cathodes, in which oxygen is catalytically electroreduced. Alternatively, such devices may contain oxygen electrodes which catalyze the evolution of oxygen from water. In general, these electrodes are known in the art as oxygen electrodes. Thus, metal-oxygen batteries, metal-air batteries, fuel cells, electrolyzers, metal electrowinning devices, etc., are among the well-known electrochemical devices which may contain oxygen electrodes. Typically, such devices contain electrocatalyst materials at one or more of their electrodes. For example, precious metals such as platinum (on carbon support) and silver (on carbon and other supports) are frequently employed as electrocatalysts.

Various electrocatalytic alloys, compounds and compound mixtures have been developed to enable such electrochemical devices to achieve more desirable systems. For example, U.S. Pat. No. 3,536,533 (Kitamura) describes the use of an alloy of gold, silver, palladium and at least one element selected from the group consisting of platinum, rhodium and ruthenium as a fuel cell electrode electrocatalyst. U.S. Pat. No. 3,305,402 (Jones et al) describes the use of a combination of platinum and ruthenium oxides as an electrocatalyst. However, both Kitamura and Jones et al describe these catalysts as fuel cell anode (or fuel oxidation) catalysts. In addition, O'Grady et al, Technical Report No. 37, "Ruthenium Oxide Catalysts For The Oxygen Electrode", Contract No., N0014-67-A-0404-0006 (AD-779-899) Office of Naval Research, May 1974 (National Technical Information Service) describes the use of ruthenium oxide as an electrochemical catalyst for both the generation and the reduction of oxygen. Also, U.S. Pat. No. 3,405,010 (Kordesch et al) teaches that spinel type electrode catalysts produces better activation of the electrode and improved electrolyte repellency of the electrode by the inclusion of ruthenium.

Thus, the foregoing prior art describes a variety of electrodes, including those which utilize iridium and/or ruthenium-containing catalysts. However, none of the references teaches or renders obvious the bismuth-rich and lead-rich pyrochlore compounds described herein, much less the particular method of preparation claimed herein.

Heretofore, many pyrochlore compounds such as the pyrochlore compounds $Pb_2Ru_2O_{7-y}$ (lattice parameter of 10.253 Å), $Pb_2Ir_2O_{7-y}$ (lattice parameter of 10.271 Å), $Bi_2Ir_2O_{7-y}$, $Bi_2Rh_2O_{7-y}$, $Pb_2Rh_2O_{7-y}$, $Pb_2Pt_2O_{7-y}$, $Cd_2Re_2O_{7-y}$ (commonly referred to as lead ruthenate, lead iridate, bismuth iridate, bismuth rhodate, lead rhodate, lead platinate and cadmium rhenate, respectively,) and similar compounds have been known. For example, Longo, Raccah and Goodenough, Mat. Res. Bull., Vol. 4, pp. 191–202 (1969), described the compounds $Pb_2Ru_2O_{7-y}$ and $Pb_2Ir_2O_{7-y}$ and their preparation at temperatures in excess of 700° C. Sleight, Mat. Res. Bull., Vol. 6, p. 775 (1971) has also described the compounds $Pb_2Ru_2O_{7-y}$ and $Pb_2Ir_2O_{7-y}$ (including the pyrochlore compound $Pb_2Ru_2O_{6.5}$ having a lattice parameter of 10.271 Å) and their preparation at 700° C. and 3000 atmospheres. U.S. Pat. No. 3,682,840 (Van Loan) describes the preparation of lead ruthenate at temperatures of 800° C. and higher. None of these references teach the existance of the lead-rich or bismuth-rich compounds made by the present invention or that such compounds can be prepared as claimed herein.

U.S. Pat. Nos. 3,769,382 (Kuo et al) and 3,951,672 (Langley et al) discloses a variety of techniques for preparing lead ruthenate and lead iridate at temperatures of at least about 600° C., and preferably at higher temperatures. However, each reference fails to recognize that the lead-rich pyrochlores used in the present invention are obtained at generally lower temperatures or that such pyrochlores have improved physical properties. Further, both references fail to teach the present method of preparing lead-rich and bismuth-rich pyrochlore compounds.

Bouchard and Gillson, Mat. Res. Bull., Vol. 6, pp. 669–680 (1971) describe the preparation and properties of $Bi_2Ru_2O_7$ and $Bi_2Ir_2O_7$, including the high conductivity and small Seebeck coefficients of each compound. However, there is no teaching that these compounds are useful electrocatalysts in electrochemical devices. Derwent's Basic Abstract Journal, Section E, Chemdoc, Week No. Y25, Abstract No. 320 (Aug. 17, 1977), Derwent Accession No. 44866Y/25 describes electrodes for electrolysis of alkaline and carbonate solutions which comprise nickelplated steel strips coated with high conductivity layers containing $Cd_2Re_2O_7$, $Pb_2Re_2O_{7-y}$ or $Ni_2Re_2O_7$. These compounds are prepared by impregnating perrhenic acid and a metal nitrate such as Cd nitrate onto a nickel strip and baking at 350° C. However, these compounds are all rhenates rather than ruthenates or iridates and are not taught to be lead-rich or bismuth-rich compounds prepared by the method of the present invention. National Bureau of Standards, Washington, D.C., Institute for Mat. Research, Abstract of Rept. No. NNSIR-75-742 (1974) describes the use of mixed oxides as oxygen-reducing electrocatalysts in acid fuel cells, including the use of barium ruthenate. However, the materials suggested for such electrocatalysts are not the pyrochlore type structure compounds made according to the present invention.

The foregoing prior art dealing with the synthesis of electrically conductive pyrochlore structure oxides teaches synthesis temperatures of at least 600° C. While elevated temperatures have been considered necessary to overcome diffusional limitations encountered in solid state reactions, such temperatures result in the formation of sintered products with low surface areas. This is disadvantageous for materials used in catalytic and electrocatalytic applications since the concentration of available catalytically active sites is limited.

To conserve energy and maximize surface area, it would be desirable to synthesize electrically conductive pyrochlore compounds at significantly lower temperatures, e.g. below 300° C. However, the kinetics of solid state reactions are unfavorably sluggish. Solution syntheses offer one possible approach to achieving these very low temperature reactions. For example Trehoux, Abraham and Thomas, *Journal of Solid State Chemistry*, Vol. 21, pp. 203-209 (1977) and *C.R. Acad. Sc. Paris*, t. 281 pp. 379-380 (1975) describe the solution preparation of a pyrochlore compound of the formula $K_{1.14}Bi^{III}_{0.27}$ $[Bi^{III}_{0.27}Bi^{V}_{4.9}][O_{4.9}OH_{1.1}]OH_{0.8}$. The synthesis is effected by adding a bismuth nitrate solution to a solution of 17% potassium hydroxide containing an excess of potassium hypochlorite. The reaction is carried out in this medium for 2 hours in a reflux type of apparatus at a temperature slightly higher than 100° C. The synthesis and resulting product are different in many respects from the synthesis and product claimed herein. The compound prepared in the cited reference is not an oxide but rather an oxyhydroxide which has a significant amount of protons incorporated into the bulk structure. Proton nuclear magnetic resonance experiments show that compounds prepared according to the present invention are oxides which do not have significant amounts of protons incorporated into the structure. The pyrochlore synthesized by Trehoux et al is not a ruthenium or iridium containing compound and, in fact, is believed not to be an electrically conductive pyrochlore. The potassium hydroxide solution used in the Trehous reference serves not only as a reaction medium, but also as a constituent in the reaction since potassium is incorporated into the A site of the pyrochlore. In contrast, the alkali solution employed in the present invention is solely a reaction medium with no measurable amount of alkali metal cations incorporated in the pyrochlore compound product.

Morgenstern-Badarau and Michel, *Ann. Chim.*, Vol. 6, pp. 109 et seq. (especially at 109-113) (1971), and *C. R. Acad. Sc. Paris*, Vol. 271, Seire C pp. 1313-1316 (1970) report the solution preparation of pyrochlore compounds having the formula $Pb_2Sn_2O_6 \times H_2O$ where $0 < X < 1$. The preparation conditions are strictly defined as follows: equimolar quantities of lead and tin are reacted from solution in the presence of the complexing agent nitrilotriacetic acid (NITA) such that the concentration of $[NITA]/[Pb^{2+}]=2$. The pH of the reaction medium is fixed at 11 and the reaction is carried out for several hours at 80° C. The compound prepared by Morgenstern-Badarau et al is a hydrated oxide whereas materials prepared according to the present invention are oxides. In addition, the pyrochlore prepared by Morgenstern-Badarau et al, while containing lead, is not similar to the lead-rich pyrochlore prepared according to the present invention. Further, the pyrochlore prepared by Morgenstern-Badarau et al is not a ruthenium or iridium containing pyrochlore and is not believed to be electrically conductive. Also, Morgenstern-Badarau et al specifically state that their method of preparation forms a solid product containing $Pb^{2+}$. In contrast, the solid product formed according to the present invention contains a mixture of $Pb^{2+}$ and $Pb^{4+}$. While the presence of a complexing agent is required in the synthesis described in the cited reference, such a complexing agent is not required according to the present invention. Furthermore, the pH range of the synthesis medium specified in the present invention clearly differs from the operable pH range of the cited reference. In fact, the Morgenstern-Badarau and Michel, *Ann. Chim.*, Vol. 6, pp. 109-124 (1971) reference clearly states that no solid product compound can be obtained if conditions which are coincident with those specified for the present invention (pH > 13.5, temperature = 80° C., zero concentration of complexing agent) are employed.

More recently, U.S. Pat. Nos. 4,129,525; 4,163,706; 4,176,094; 4,192,780; 4,203,871 and 4,225,469 to Horowitz et al form pyrochlore compounds in which the pyrochlore oxide is precipitated from an alkaline solution and then separated therefrom by filtration. The filtrate is washed with water and dried to yield the pyrochlore solids. In U.S. Pat. Nos. 4,124,539 also to Horowitz et al, the precipitate is not recovered by filtration, but instead, the liquid of the pyrochlore/alkaline solution suspension is evaporated to dryness and the resulting oxide is washed in alkali or acetic acid. While the alkaline precipitation medium is the same as that disclosed in the other Horowitz et al patents, the particular method of separating the pyrochlore oxide precipitate from the precipitation medium claimed herein is markedly different.

Therefore, in summary, there exists a formidable body of prior art describing the existence of various pyrochlores, their potential uses (including uses as dielectric materials) and describing various metals and metal oxides as electrocatalyst materials. Notwithstanding this prior art, there is no suggestion or teaching that (a) the lead-rich or bismuth-rich pyrochlore compounds made according to the present invention exist, or that (b) the present invention may be used to make such compounds.

SUMMARY OF THE INVENTION

The present invention is directed to a method of preparing compounds having the formula:

$$A_2[B_{2-x}A_x]O_{7-y} \qquad (1)$$

wherein A is selected from the group consisting of lead, bismuth and mixtures thereof, B is selected from the group consisting of ruthenium, iridium and mixtures thereof, and wherein x is a value such that $0 < x \leq 1.0$ and y is a value such that $0 \leq y \leq 1$. More specifically, the present invention relates to synthesizing pyrochlore compounds having the formula shown in (1) in an alkaline medium, displacing the alkaline medium with water, atomizing the resultant slurry and freeze drying the resultant product. When prepared in this manner, there will be formed noble metal pyrochlore compounds of high surface area and reduced agglomeration relative to that obtained in the absence of the atomizing and freeze drying steps. The compounds thus formed have many uses including use as oxygen electrodes in electrochemical devices.

DETAILED DESCRIPTION OF THE INVENTION

The compounds made according to the present invention, as represented by formula (1) above, display the pyrochlore crystal structure. Pyrochlore structure oxides are represented by the general formula $A_2B_2O_6O'$ wherein A and B are metal cations. A detailed description of their crystallographic structure may be found in *Structural Inorganic Chemistry*, Fourth Edition by A. F. Wells, Clarendon Press, Oxford, 1975. Briefly, oxides of this type display a face-centered cubic structure having a unit cell dimension of about 10 Å. The B cations are octahedrally coordinated by oxygen anions (O). The structural framework is formed by a three dimensional array of the corner shared octahedra, each sharing corners with six others. This framework has the composition $B_2O_6$. As Wells describes, this framework of octahedra is "based on the diamond net, having large holes which contain the O' and two A atoms, which themselves form a cuprite-like net $A_2O'$ interpenetrating the octahedral framework". The octahedra are actually arranged in tetrahedral clusters. These clusters of octahedra are then tetrahedrally arranged so as to form the large holes in the structure described by Wells. Each of these large holes may also be defined by four tetrahedrally arranged puckered, hexagonal rings which are formed by the corner shared octahedra. The A cations reside in the center of these puckered hexagonal rings and are coordinated by the six O anions which define the rings plus two more O' cations at a slightly different distance. These O' anions reside at the center of the large holes in the octahedral framework. It is the O' anions which may be partially or totally absent, leading to the general pyrochlore oxide formula $A_2B_2O_{7-y}$ where $0 \leq y \leq 1$. Thus, the compounds made according to the present invention are referred to as pyrochlore compounds, albeit they are not stoichiometric pyrochlores, but rather are lead-rich and/or bismuth-rich compounds of the formula above.

Figure 1:
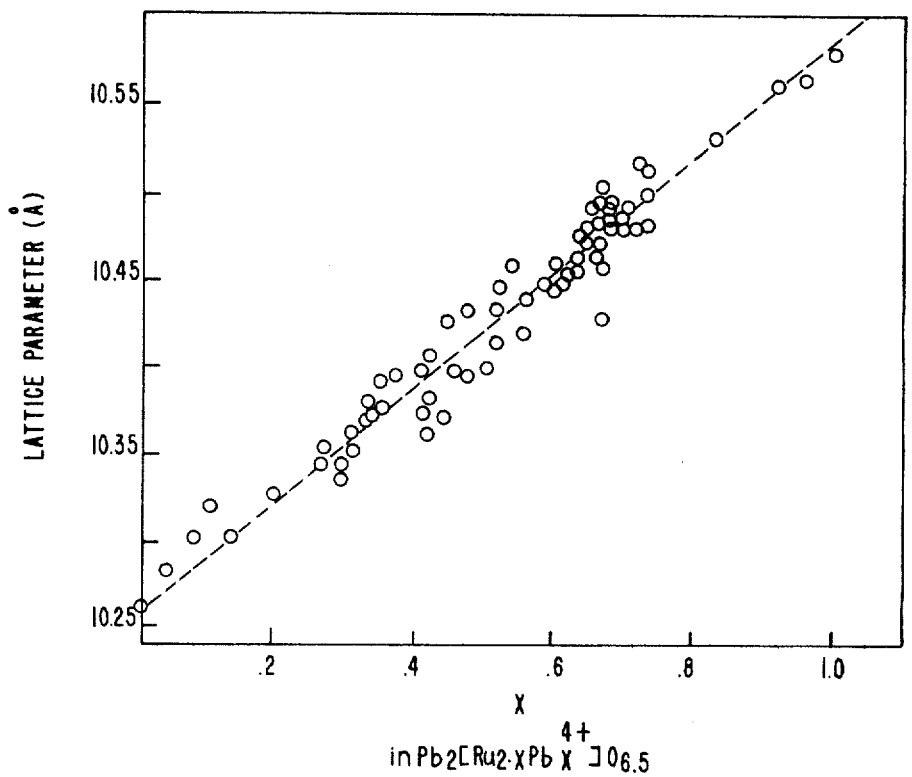
FIG. 1 illustrates the variation of lattice parameter with increasing amounts of lead on B cation sites.
Figure 2:
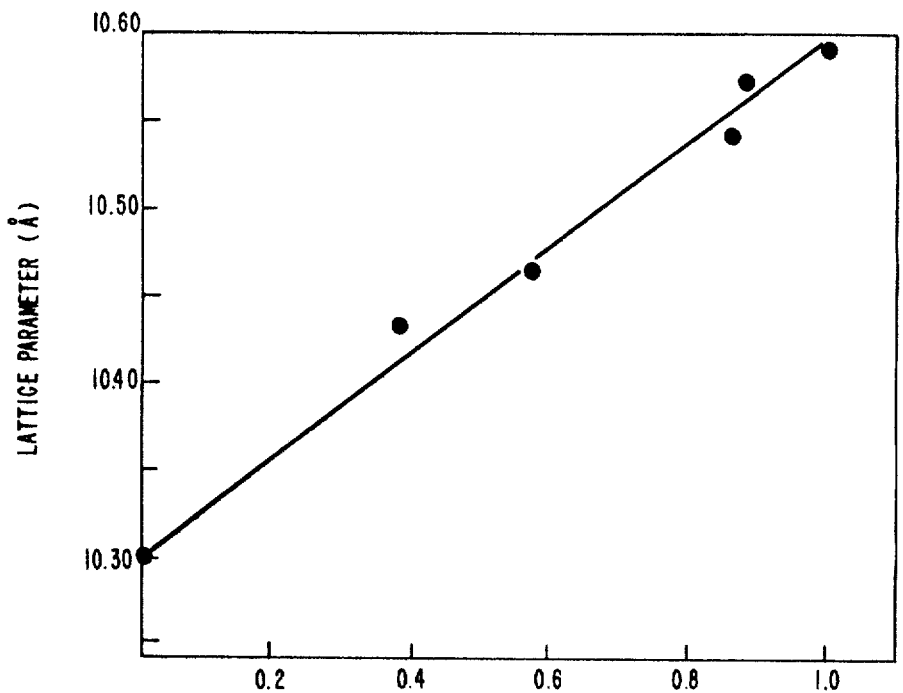
FIG. 2 illustrates the variation of lattice parameter with increasing amounts of bismuth on B cation sites.
Figure 2:
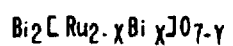

The pyrochlore compounds prepared according to the present invention exhibit an expanded lattice. While not wishing to be bound by any particular theory, it is believed that substitution of the larger lead or bismuth for the smaller noble metal cations on the octahedrally coordinated B-site leads to the considerable enlargement of the pyrochlore unit cell dimension. The relationship between lattice parameter ($a_o$) and the extent of substitution of the octahedrally coordinated ruthenium or iridium by lead or bismuth is linear and this relationship is illustrated for two series of compounds in FIGS. 1 and 2. The greater the amount of lead or bismuth on the B-site (as indicated by the value of x in formula 1), the greater the lattice parameter. (See H. S. Horowitz, J. M. Longo and J. T. Lewandowski in *Mat. Res. Bull.*, 16, 489–96 (1981), the entire disclosure of which is incorporated herein by reference).

In general terms, the present invention involves first reacting A and B cations to yield a pyrochlore oxide by precipitation of A and B cations from an aqueous solution source of these cations in a liquid alkaline medium in the presence of an oxygen source at a temperature below about 200° C. The synthesis occurs entirely in a solution medium where the reaction kinetics are quite favorable and not so restrictive as is found in solid state reactions, notwithstanding the low reaction temperature employed in the present method. These conditions result in the formation of product in high surface area (i.e. 60–200 m²/g). High surface area is particularly advantageous for a material used in a catalytic or electrocatalytic application since the concentration of available catalytically active sites is maximized.

The aqueous solution source of reactant (A and B) cations is meant by definition to include any aqueous solution which will dissolve ionic A and B cations. This metal cation containing solution may be prepared using A source materials which include lead nitrate, lead oxide, lead chloride, lead acetate, lead carbonate, lead citrate, lead oxalate, bismuth nitrate, bismuth oxide, bismuth chloride, bismuth oxalate and bismuth oxychloride as well as mixtures thereof. Desirably, the A source material used in preparing the aqueous solution source of A and B cations is either a lead source material or a bismuth source material, although, mixtures of each may be used. Preferred A source materials are lead and bismuth nitrates. The B source materials used in preparing the aqueous solution source of A and B cations include ruthenium chloride, ruthenium nitrate, ruthenium nitrosyl nitrate, iridium chloride, iridium hydroxide and iridium oxalic acid as well as mixtures thereof. Desirably, the B source material is either a ruthenium source or an iridium source, although mixtures thereof may be employed. The preferred B source materials include ruthenium nitrate and iridium chloride.

The aqueous solution source of A and B cations is prepared by dissolving appropriate amounts of A source material and B source material in aqueous solvent. In some cases water is adequate for the dissolution. When necessary, the A and B source materials may be dissolved in aqueous acid solutions, the acid solutions being just strong enough to cause the A and B source materials to dissolve. Acids such as nitric or hydrochloric may be used, but nitric acid is preferred.

The A source material and B source material are dissolved in relative amounts so as to achieve, in general, an initial reactant A to B ion ratio of at least about 1.0:1.0. Desirably, this ratio is within the range of about 1.05:1.0 to about 10.0:1.0. In the preferred embodiments, the A to B ion ratio is in the range of about 1.2:1.0 to about 5.0:1.0. As a practical matter, the reactants may be used in an A to B ion ratio appreciably higher than the ratio of A to B in the final pyrochlore product.

Preparation of the aqueous solution source of A and B cations in the manner just described assures atomic scale mixing of these cations and thereby provide favorably kinetics for the low temperature, solution medium synthesis that follows.

The liquid alkaline medium is meant by definition to include any liquid alkaline medium which will promote reaction between the A ions and B ions from the mentioned aqueous solution source of A and B cations and will effect the precipitation of the desired pyrochlore structure. The liquid alkaline medium may be any which satisfies this definition and includes aqueous basic solutions of alkali metal hydroxides. Thus, the liquid alkaline medium may desirably be an aqueous basic solution containing a base selected from the group consisting of sodium hydroxide, rubidium hydroxide, cesium hydroxide, potassium hydroxide and mixtures thereof. Desirably, sufficient base is included so as to form a liquid alkaline medium having a pH of at least about 12.0. Preferably, sufficient base is employed so as to produce a liquid alkaline medium having a pH of between about 13 and 14. Exact amounts of base material need not be specified since pH determination is within the purview of the artisan.

It is also helpful, although not necessary, to saturate the alkaline reaction medium with one or more of the reactant cations (and especially with the most alkali soluble cation reactant) prior to combining the aqueous solution source of A and B cations with the alkaline reaction medium. This avoids large discrepancies between cation ratios in the reacted product and in the initial reactant mixture due to possible solubility in the alkaline reaction medium of one or more of the reactant cations.

The alkaline medium acts solely as a reaction medium and not as a constituent in the reaction. This is supported in that the pyrochlores prepared according to this invention show less than 0.02% (by weight) alkali metal cation as measured by atomic absorption.

The oxygen source is meant to include any source which will provide the oxygen needed to form the pyrochlore compound. The oxygen source may be any of the A source material, the M source material, the alkaline liquid medium or combinations thereof. Alternatively or additionally, the oxygen source may be or include independent oxygen contributing material, e.g., bubbled oxygen or oxygen-containing salts or other additives. In any event, an essential aspect of the present invention is the inclusion of adequate oxygen to permit the formation of the pyrochlore structure.

No criticality exists as to whether the aqueous solution source of A and B cations is added to the alkaline medium or whether the alkaline medium is added to the aqueous solution source of reactant cations. However, the former is usually practiced to insure that all of the cations contact an excess of alkaline medium. In general, at least about 1.0 liter of liquid alkaline medium is used per sum total mole of metal cation reactant. As mentioned, the reaction should be carried out at temperatures below about 200° C. Desirably, the reaction temperature is within the range of about 10° to about 100° C. Preferably, the reaction is carried out at temperatures within the range of about 50° to about 80° C.

During the reaction period the alkaline medium may be replaced with fresh alkaline medium although this is not necessary for successful practice of the present invention.

The reaction need be carried out for a time sufficient for reaction to occur. With many reactant combinations, at least a partial reaction occurs almost instantly. Thus, the particular reaction time is a matter of choice. However, the longer the reaction time the greater the extent of reaction. As a practical matter, a significant amount of product is obtained with a reaction time of about one day, and generally a reaction time of about 3 to 7 days is advantageous.

After the reaction has been completed (or terminated), the pyrochlore oxide precipitate is displaced from the alkaline medium by water. Typically this displacement is accomplished by allowing the solid precipitate to settle in the alkaline reaction medium. The majority of the alkaline supernatant liquid is then removed by decanting or pipetting leaving just enough liquid so that the precipitate remains submerged. The reaction beaker is then refilled with water, the precipitate reslurried and allowed to settle. Most of the liquid is pipetted off and replaced with water. This procedure is repeated several times (typically three) with the precipitate being kept completely submerged throughout the entire procedure. The number of necessary liquid displacements can be determined by measuring the pH of the decanted or pipetted supernatant liquid. When the pH has returned to essentially a neutral level (i.e., pH of about 7.0), no further displacements are required.

The resultant slurry of water and pyrochlore precipitate is then atomized to form a fine spray. Atomization may be effected in any suitable apparatus for forming fine sprays. Typically, atomization is achieved with a hydraulic spray nozzle or a pneumatic atomizing nozzle. The pneumatic atomizing nozzles, which use compressed air to effect spray particle separation, produce the very finest droplets and are therefore preferred. A precise description of exactly what nozzles are suitable is difficult since a number of parameters which affect atomization (e.g., flow rate, pressure, orifice size, etc.) may be varied on any particular nozzle. It is expected that those skilled in the art are cognizant of the effects of these parameters and of the relative atomization capabilities of various spray nozzles. In general, any atomization nozzle may be used, but the extent of agglomeration in the product powder will be minimized by using those nozzles which produce the finest droplet size. Efficient atomization can rarely be obtained with air pressures less than 10 p.s.i.

For hydraulic spray nozzles, the factors providing finer spray droplets include small capacities (in gallons per hour), higher spraying pressures and hollow cone spray patterns. Conversely, coarser spray droplets are produced by larger capacities, lower spraying pressures and full cone spray patterns.

The finest atomization is most easily obtained with air atomizing nozzles because compressed air is used to separate the liquid into fine particles. At any given liquid pressure, a change in air pressure not only affects capacity but also spray droplet size. Increasing air pressure at any liquid pressure decreases liquid droplet size, and decreasing air pressure increases liquid droplet size. Representative of the type of spray nozzles which are found to be suitable are the ¼ J series air atomization nozzles manufactured by Spraying Systems Company, Wheaton, Ill.

The resulting spray is then frozen by contact with a freezing medium (e.g., liquid nitrogen) to yield a finely divided frozen powder which comprises an intimate mixture of pyrochlore compound and ice slurried in the freezing medium. Suitable freezing medium include hexane chilled by dry ice and acetone and dichlorodifluoromethane (Freon 12, E. I. duPont de Nemours & Co.).

The frozen slurry is then freeze dried (i.e., the ice is removed from the slurry by sublimination). Suitable methods of freeze drying are described in F. J. Schnettler, F. R. Monforte, & W. W. Rhodes, Science of Ceramics, Vol. 4, pp. 79-90, The British Ceramic Society, Stoke-on-Trent, England (1968), the entire disclosure of which is incorporated herein by reference.

The reaction product includes one or more of the pyrochlore compounds of the formula (1) above. When preferred amounts of reactants are employed, compounds of formula (1) may be obtained wherein $0<x\leqq 1.0$. Thus, among the compounds obtained are:

$$Pb_2[Ru_{2-x}Pb_x]O_{7-y} \quad (2)$$

$$Pb_2[Ir_{2-x}Pb_x]O_{7-y} \quad (3)$$

$$PbBi[Ru_{2-x}Pb_x]O_{7-y} \quad (4)$$

$$PbBi[Ir_{2-x}Pb_x]O_{7-y} \quad (5)$$

$$Pb_aBi_b[Ru_{2-x}Pb_x]O_{7-y} \quad (6)$$

$$Pb_2[Ru_{2-x}(Pb_cBi_d)_x]O_{7-y} \quad (7)$$

and the like, wherein x and y are as defined, and wherein a+b=2 and c+d=x. Also, included are the bismuth-rich counterparts to the foregoing and other variations within the scope of formula (1) which should now be apparent to the artisan. If desired, various post treatments may be employed (e.g. heat treatments to improve the crystallinity of the product and/or washing in various media in order to leach out any unreacted metal species). The above pyrochlores produced by the method of the present invention have essentially the same surface area as a powder prepared by the method disclosed in U.S. Pat. Nos. 4,129,525 and 4,176,094 (e.g., 50–200 m²/g). However, the bulk density is about one-tenth of the prior methods, which indicates reduced agglomeration.

A critical aspect of this invention is displacing the alkaline reaction medium with water without exposing the pyrochlore precipitate to air. If not kept submerged in liquid continually, the precipitate agglomerates irreversibly which results in a higher bulk density.

Figure 3:
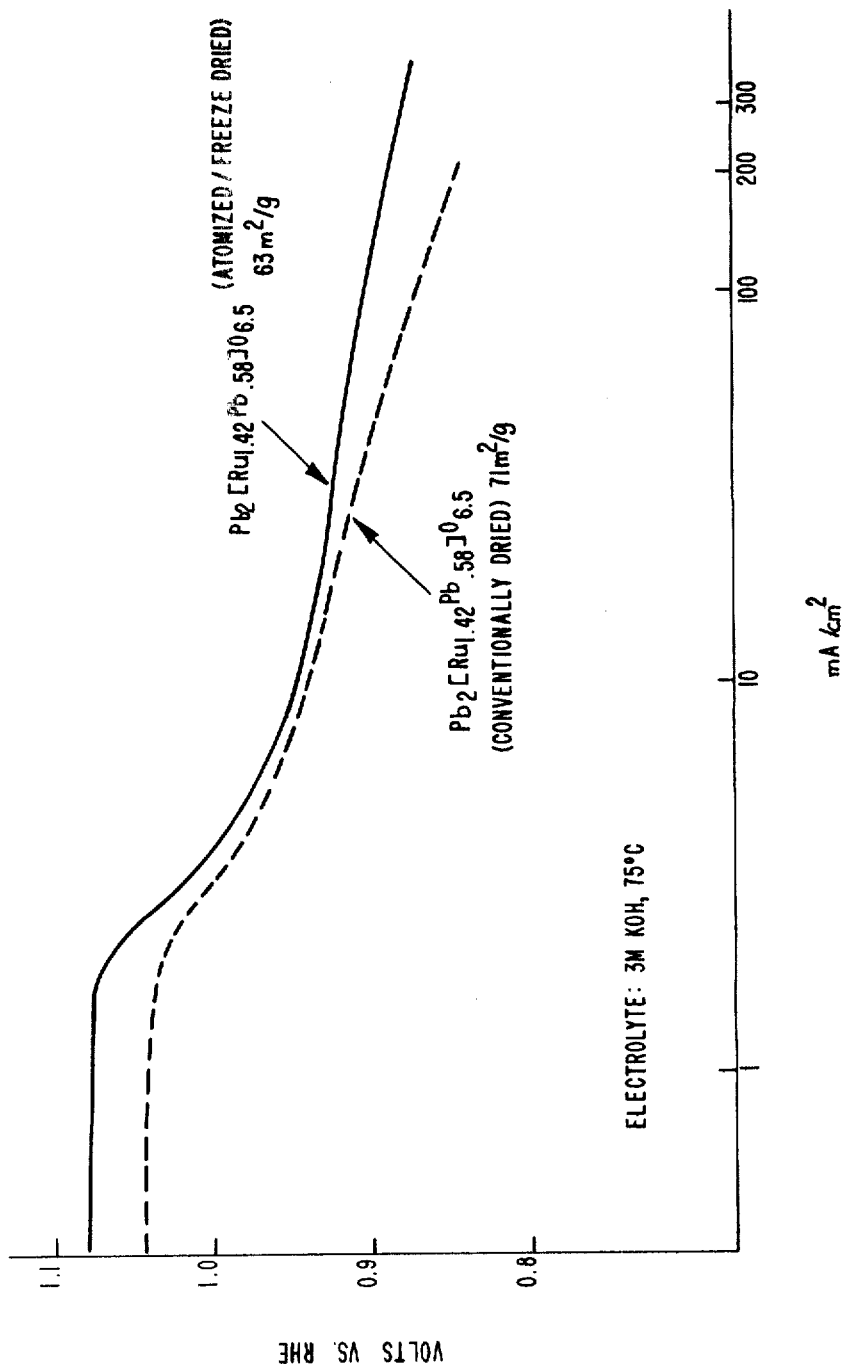
FIG. 3 illustrates the variation of oxygen reduction voltage with current density for $Pb_2[Ru_{1.42}Pb_{0.58}]O_{6.5}$ prepared conventionally and in accordance with the present invention.

The reduced agglomerization in the powders prepared according to the present invention is reflected in superior electrocatalytic activity. FIG. 3 shows oxygen electro-reduction activity for two ruthenate pyrochlores which are identical except that one was dried conventionally while the other was atomized and freeze dried according to the present invention. The atomized and freeze dried product shows significantly better activity.

The present invention will be more fully understood by reference to the following examples which are presented for illustrative purposes only, and should not be construed to limit the claims appended hereto:

EXAMPLE 1

A bismuth-rich pyrochlore, e.g., $Bi_2[Ru_{2-x}Bi]O_{7-y}$, is prepared as follows:

$Bi(NO_3)_3.5H_2O$ and $Ru(NO_3)_3$ are combined in aqueous solution in an approximately 1.2:1.0 molar ratio of bismuth to ruthenium. That is, about 28.81 grams of $Bi(NO_3)_3.5H_2O$ and about 55.60 grams of $Ru(NO_3)_3$ aqueous solution (9% by weight Ru) are added to 130 ml of concentrated (15.7 N) $HNO_3$ and 250 ml of water. The aqueous solution of bismuth and ruthenium is then added, with stirring, to 500 ml of 3 M KOH at 75° C. Precipitation of a solid occurs immediately. At this point, sufficient KOH and water are added to adjust the pH to 13.5 and the total volume to 2000 ml. The beaker is kept covered and the slurry is sparged with oxygen. The reaction is carried out at 75° C., with stirring, for approximately 7 days. The reaction mixture is cooled, and the precipitate allowed to settle. Most of the alkaline medium is removed with a pipette, leaving just enough liquid so that the precipitate remains submerged. The beaker is then refilled with water, the precipitate re-slurried and allowed to settle. Most of the liquid is pipetted off and replaced with water. This procedure was repeated twice, with the precipitate being kept completely submerged throughout the entire procedure.

Finally, most of the water is pipetted off one last time so that a thick slurry remains. The slurry is then sprayed through an air atomization nozzle into a covered beaker containing liquid nitrogen. The nozzle, manufactured by Spraying Systems Co., Wheaton, Ill., is model ¼ JCO fitted with fluid cap #2850 (liquid orifice diameter of 0.028") and air cap #70. The nozzle is pressurized by 20 p.s.i. of air. The resulting slurry of liquid nitrogen and finely divided frozen powder is then freeze dried. X-ray diffraction shows that the reacted product is a crystalline material exhibiting the pyrochlore crystal structure. The bismuth to ruthenium ratio, as determined experimentally by X-ray fluorescence, is 1.44:1.0. The formula for the pyrochlore may therefore be expressed as $Bi_2[Ru_{1.64}Bi_{0.36}]O_{7-y}$. The surface area measured by the BET $N_2$ adsorption method is 120 m²/g. The bulk (tap) density of the powder is measured to be 0.1 g/cc.

EXAMPLE 2

A bismuth-rich pyrochlore, e.g., $Bi_2Ru_{2-x}Bi_xO_{7-y}$, is prepared as follows:

$Bi(NO_3)_3.5H_2O$ and $Ru(NO_3)_3$ are combined in aqueous solution in an approximately 1.2:1.0 molar ratio of bismuth to ruthenium. That is, about 14.396 grams of $Bi(NO_3)_3.5H_2O$ and about 31.250 grams of $Ru(NO_3)_3$ aqueous solution (8% by weight Ru) are added to 50 ml conc.$HNO_3$ and 100 ml water. This aqueous solution of bismuth and ruthenium is then added, with stirring, to 250 ml of 3MKOH at 75° C. Precipitation of a solid occurs immediately. Sufficient KOH and water are then added to adjust the pH to 13.5 and the total volume to 1000 ml. The beaker is kept covered and the slurry is sparged with oxygen. The reaction is carried out at 75° C., with stirring, for approximately 7 days. The reaction mixture is cooled and the precipitate allowed to settle.

About one third of the wet precipitate is scooped out with a spatula, placed in a container, and immersed with liquid nitrogen. The frozen sample is then freeze dried. This sample is designated 2-A.

The remaining two thirds of the precipitate is separated by vacuum filtration, washed with water and dried in a conventional manner. This sample is designated as 2-B. Approximately half of this conventionally dried sample (2-B) is then re-slurried in water and allowed to settle. Most of the water is then removed by vacuum pipetting, leaving a thick slurry. This slurry is then sprayed through an air atomization nozzle as described in Example 1. This sample is designated as 2-C.

X-ray diffraction shows that each sample is a crystalline material exhibiting the pyrochlore crystal structure. The bismuth to ruthenium ratio, as determined experimentally by X-ray fluorescence, is 1.76:1.0. The formula for each pyrochlore sample may therefore be expressed as $Bi_2[Ru_{1.45}Bi_{0.55}]O_{7-y}$.

A comparison of the properties of the samples discussed in Examples 1 and 2 is given in Table I.

TABLE I

| SAMPLE | Composition | Surface Area (m²/g) | Bulk Density (g/cc) |
| --- | --- | --- | --- |
| Example 1 Atomized/Freeze Dried | $Bi_2[Ru_{1.64}Bi_{.36}]_{7-y}$ | 120 | 0.1 |
| Sample 2-A Freeze Dried | $Bi_2[Ru_{1.45}Bi_{.55}]O_{7-y}$ | 162 | 0.4 |
| Sample 2-B Conventionally Dried | $Bi_2[Ru_{1.45}Bi_{.55}]O_{7-y}$ | 137 | 1.3 |
| Sample 2-C Conventionally Dried, Re-Slurried, Atomized/Freeze Dried | $Bi_2[Ru_{1.45}Bi_{.55}]O_{7-y}$ | 141 | 1.1 |

While the above-described variations in powder preparation conditions do not introduce significant differences in surface area, such variations have a profound effect on bulk density (i.e., agglomeration). As shown in Table I, the lowest density (and lowest degree of agglomeration), 0.1 g/cc, is obtained when the atomization/freeze drying of the precipitate is employed. If the powder is merely freeze dried without first being subjected to atomization, the bulk density is 0.4 g/cc. In contrast, a conventionally dried sample has a bulk density of 1.3 g/cc. Finally, if a conventionally dried sample is re-slurried and then atomized and freeze dried, the resulting bulk density (1.1 g/cc) shows little improvement over a conventionally dried sample. This result demonstrates that a precipitate will suffer irreversible agglomeration when exposed to air, rather than being continually submerged in a liquid.

What is claimed is:

1. A method of preparing compounds having the formula:

$$A_2[B_{2-x}A_x]O_{7-y}$$

wherein A is selected from the group consisting of lead, bismuth and mixtures thereof, wherein B is selected from the group consisting of ruthenium, iridium and mixtures thereof, wherein x is a value such that $0<x\leqq 1.0$ and y is a value such that $0\leqq y\leqq 1$, comprising:

(a) reacting A cations and B cations from an aqueous solution source of these cations in a liquid alkaline medium having a pH of at least about 12.0 in the presence of an oxygen source at a temperature below about 200° C. for a sufficient time to form a pyrochlore precipitate, (b) displacing the liquid alkaline medium with water to form a slurry comprising water and pyrochlore precipitate, thereby avoiding contact of the precipitate thus formed with air;

(c) atomizing the slurry thus formed to produce a fine spray, (d) contacting the spray thus formed with a freezing medium for a period of time sufficient to form a frozen powder comprising an intimate mixture of pyrochlore compound and ice slurried in the freezing medium, (e) freeze drying the frozen powder thus formed to recover a pyrochlore compound of reduced agglomeration relative to that obtained in the absence of steps (c)–(e).

2. The method of claim 1 wherein said aqueous solution source contains A source material selected from the group consisting of lead nitrate, lead oxide, lead chloride, lead acetate, lead carbonate, lead citrate, lead oxalate, bismuth nitrate, bismuth oxide, bismuth chloride, bismuth oxalate, bismuth oxychloride and mixtures thereof and B source material selected from the group consisting of ruthenium chloride, ruthenium nitrate, ruthenium nitrosyl nitrate, iridium chloride, iridium hydroxide and iridium oxalic acid.

3. The method of claim 2 wherein said liquid alkaline medium is an aqueous basic solution of alkali metal hydroxide.

4. The method of claim 3 wherein said aqueous basic solution contains a base selected from the group consisting of sodium hydroxide, rubidium hydroxide, cesium hydroxide, potassium hydroxide and mixtures thereof.

5. The method of claim 4 wherein said reacting is performed within the temperature range of about 10° C. to about 100° C.

6. The method of claim 5 wherein said pH is within the range of about 13 to 14.

7. The method of claim 6 wherein said reacting is performed within the temperature range of about 50° C. to about 80° C.

8. The method of claim 1 wherein A is lead.

9. The method of claim 8 wherein said aqueous solution source contains as A source material lead nitrate and contains B source material selected from the group consisting of ruthenium nitrate and iridium chloride.

10. The method of claim 9 wherein said liquid alkaline medium is an aqueous basic solution of alkali metal hydroxide.

11. The method of claim 10 wherein said aqueous basic solution contains a base selected from the group consisting of sodium hydroxide, rubidium hydroxide, cesium hydroxide, potassium hydroxide and mixtures thereof.

12. The method of claim 11 wherein said reacting is performed within the temperature range of about 10° C. to about 100° C.

13. The method of claim 12 wherein said pH is within the range of about 13 to about 14.

14. The method of claim 13, wherein said reacting is performed within the temperature range of about 50° C. to about 80° C.

15. The method of claim 1 wherein A is bismuth.

16. The method of claim 15 wherein said aqueous solution source contains as A source bismuth nitrate and contains B source material selected from the group consisting of ruthenium nitrate and iridium chloride.

17. The method of claim 16 wherein said liquid alkaline medium is an aqueous basic solution of alkali metal hydroxide.

18. The method of claim 17 wherein said aqueous basic solution contains a base selected from the group consisting of sodium hydroxide, rubidium hydroxide, cesium hydroxide, potassium hydroxide and mixtures thereof.

19. The method of claim 18 wherein said reacting is performed within the temperature range of about 10° C. to about 100° C.

20. The method of claim 19 wherein said pH is within the range of about 13 to about 14.

21. The method of claim 20 wherein said reacting is performed within the temperature range of about 50° C. to about 80° C.

* * * * *